United States Patent [19]

Kobayashi et al.

[11] 4,149,203

[45] Apr. 10, 1979

[54] TAPE RECORDER

[75] Inventors: Minoru Kobayashi, Hachioji; Shigeru Nemoto, Tachikawa, both of Japan

[73] Assignee: Olympus Optical Co., Ltd., Tokyo, Japan

[21] Appl. No.: 780,756

[22] Filed: Mar. 24, 1977

[30] Foreign Application Priority Data

Mar. 26, 1976 [JP] Japan .................................. 51-33211
Apr. 16, 1976 [JP] Japan ............................. 51-47753[U]

[51] Int. Cl.² ...................... G11B 21/22; G11B 15/04; G11B 15/48; G11B 15/32
[52] U.S. Cl. .................................... 360/60; 360/105; 360/74.1; 360/96.1
[58] Field of Search ...................... 360/105, 96, 74, 60

[56] References Cited

U.S. PATENT DOCUMENTS

| | | | |
|---|---|---|---|
| 3,571,524 | 3/1971 | Kozu et al. | 360/96 |
| 3,752,486 | 8/1973 | Nakamura | 360/105 |
| 3,759,529 | 9/1973 | Yoshii | 360/105 |
| 4,010,493 | 3/1977 | Cicatelli | 360/105 |

Primary Examiner—Robert S. Tupper

[57] ABSTRACT

A tape recorder provided with a controlling mechanism comprising a rockable control lever, a head support lever for supporting a magnetic head and a pinch roller support lever for supporting a pinch roller mounted rockably and coaxially with each other, a first spring stretched between said control lever and the head support lever to shift the magnetic head toward the tape accompanying the rocking motion of the control lever, and a second spring stretched between said control lever and the pinch roller support lever to shift the pinch roller toward the tape accompanying the rocking motion of the control lever, at least one of said first and second springs being charged with a returning force accompanying the magnetic head and the pinch roller shifting toward the tape.

11 Claims, 18 Drawing Figures

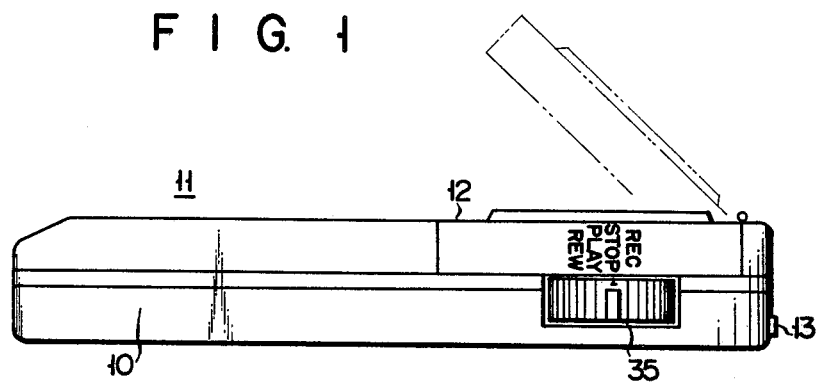
FIG. 1
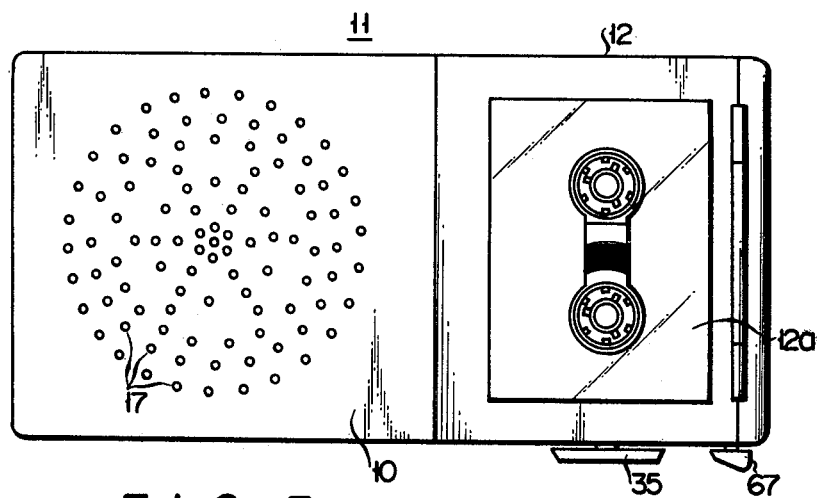
FIG. 2
FIG. 3
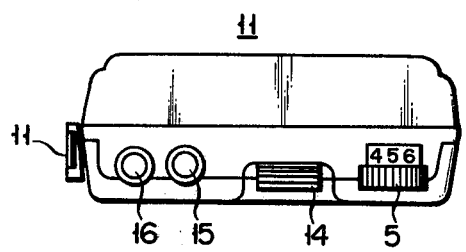
FIG. 5
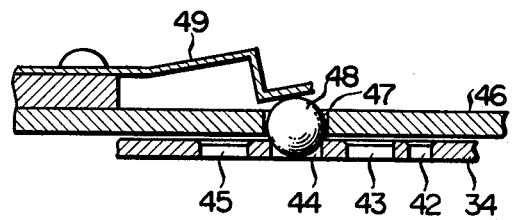

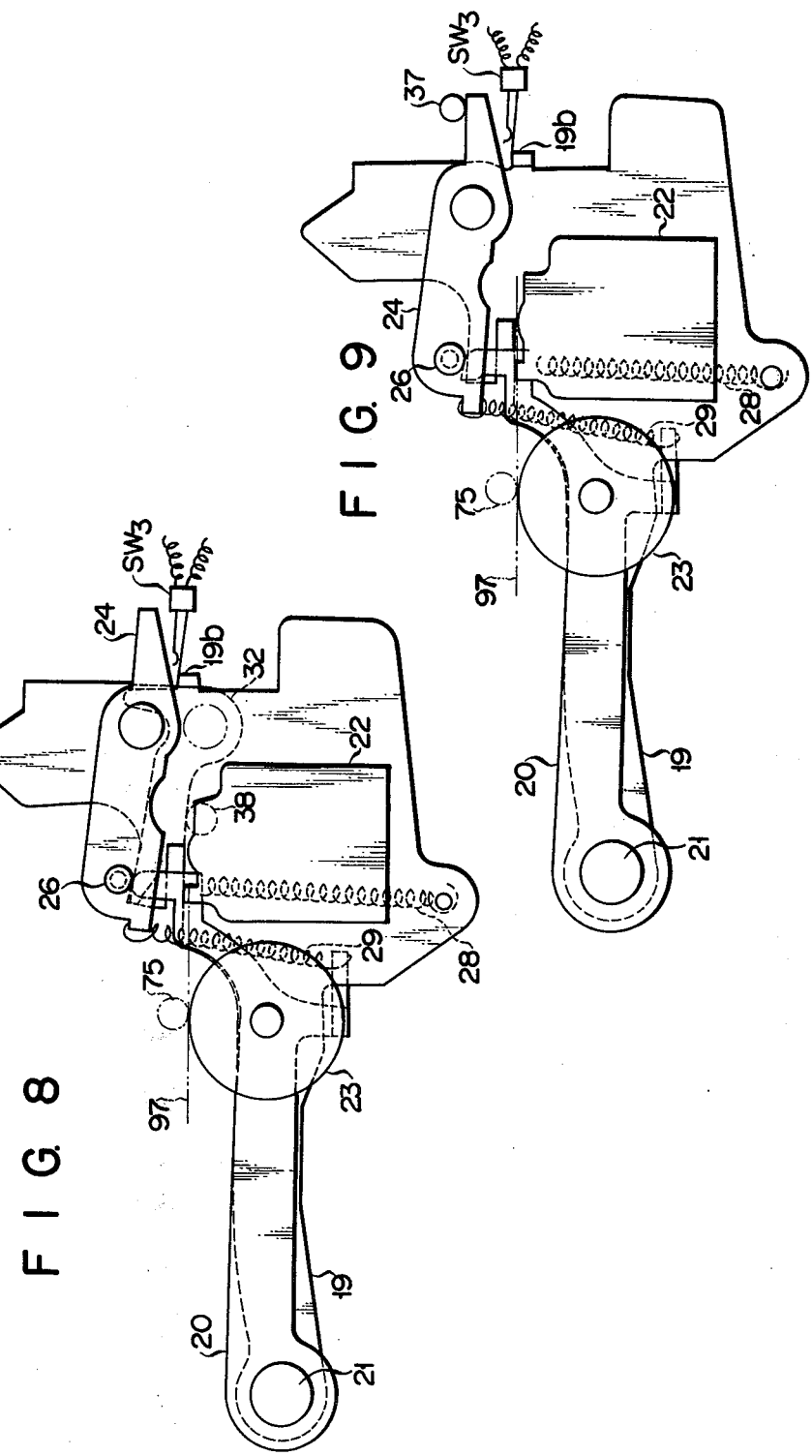

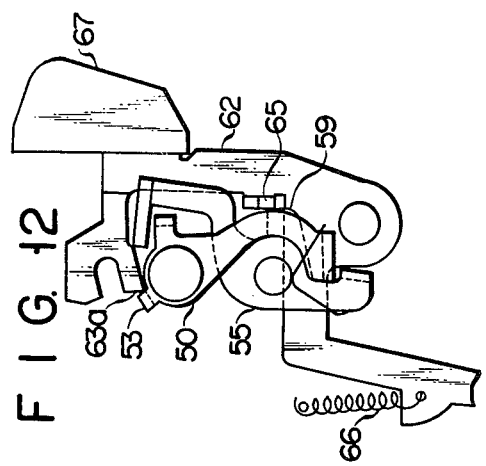
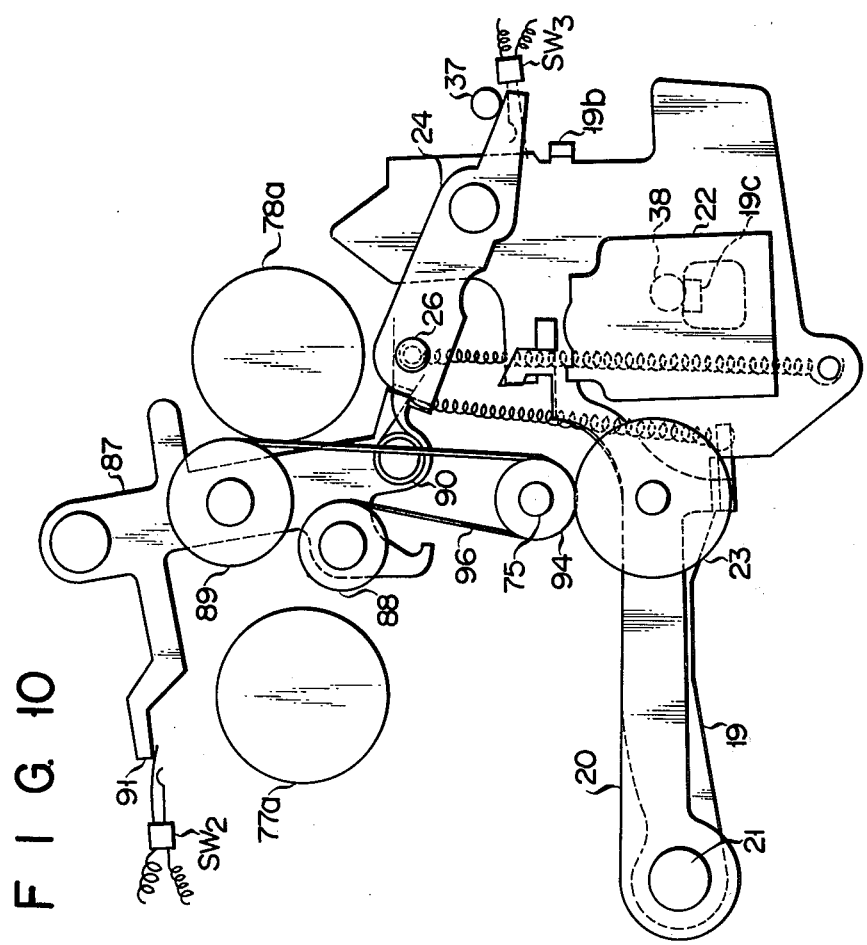

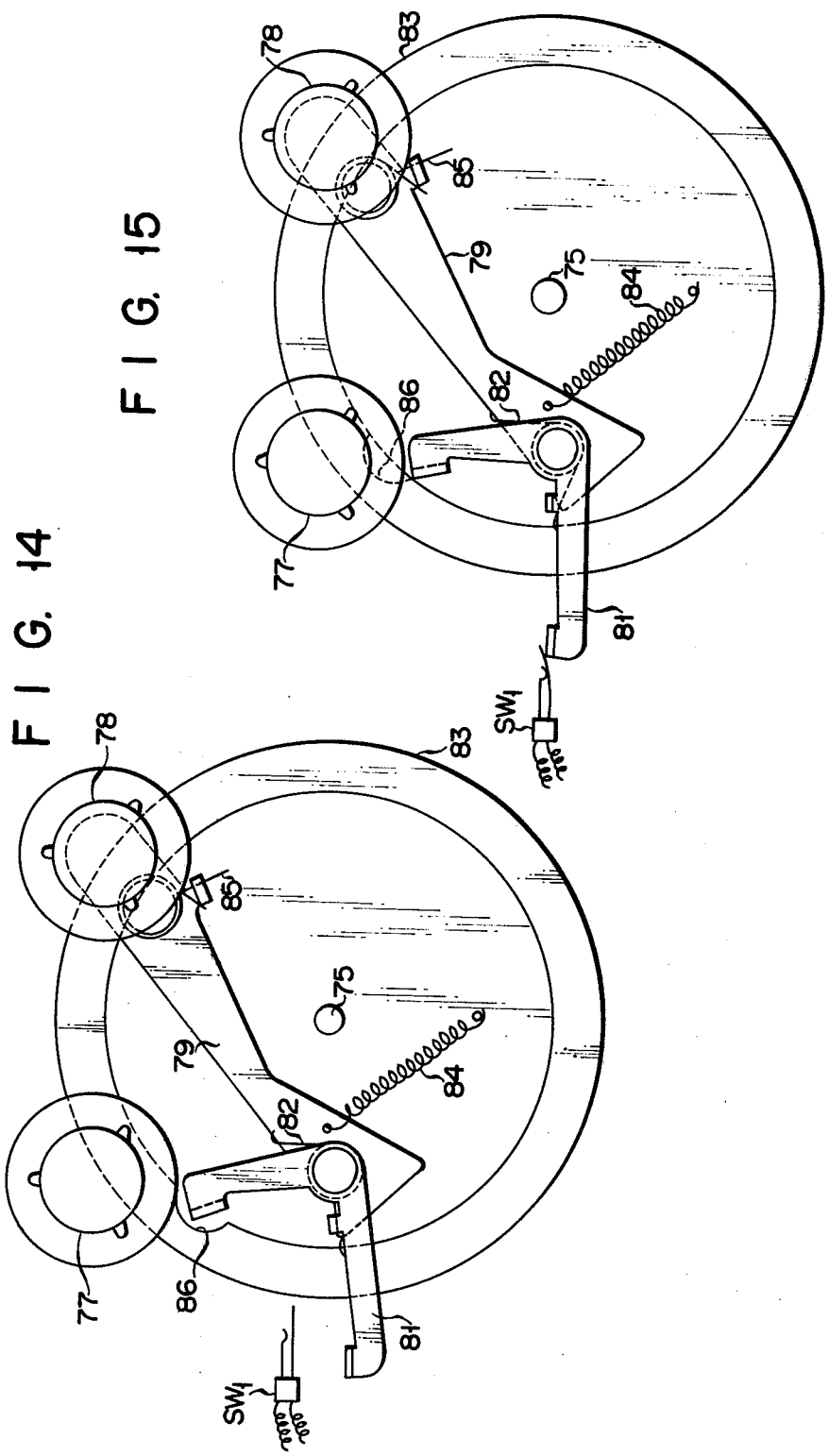

TAPE RECORDER

BACKGROUND OF THE INVENTION

This invention relates to a tape recorder provided with a controlling mechanism capable of disjunctively controlling a magnetic head and a pinch roller away from a tape.

Although various types of such controlling mechanisms have conventionally been developed, they are now confronted with increasing demands for reduced number of components, simplified construction, overall miniaturization, and ease of operation as well as for higher reliability as tape recorders today are usually required to be smaller and lighter.

SUMMARY OF THE INVENTION

Accordingly, an object of this invention is to provide a tape recorder having a controlling mechanism to fulfill the above-mentioned requirements and assuring smaller size and lighter weight.

BRIEF DESCRIPTION OF THE DRAWING

FIGS. 1 to 16 show a tape recorder according to an embodiment of this invention, wherein FIG. 1 is an overall side view, FIG. 2 is an overall plan view, FIG. 3 is an overall front view, FIG. 4 is a plan view of the controlling mechanism, FIG. 5 is a sectional view illustrative of the relation between a sphere provided for a substrate and click holes formed on a control plate, FIG. 6 is a plan view of a driving mechanism, and FIGS. 7 to 16 are plan views of the mechanical parts illustrative of the respective operating conditions;

DETAILED DESCRIPTION OF THE PREFERRED EMBODIMENTS

Figure 4:
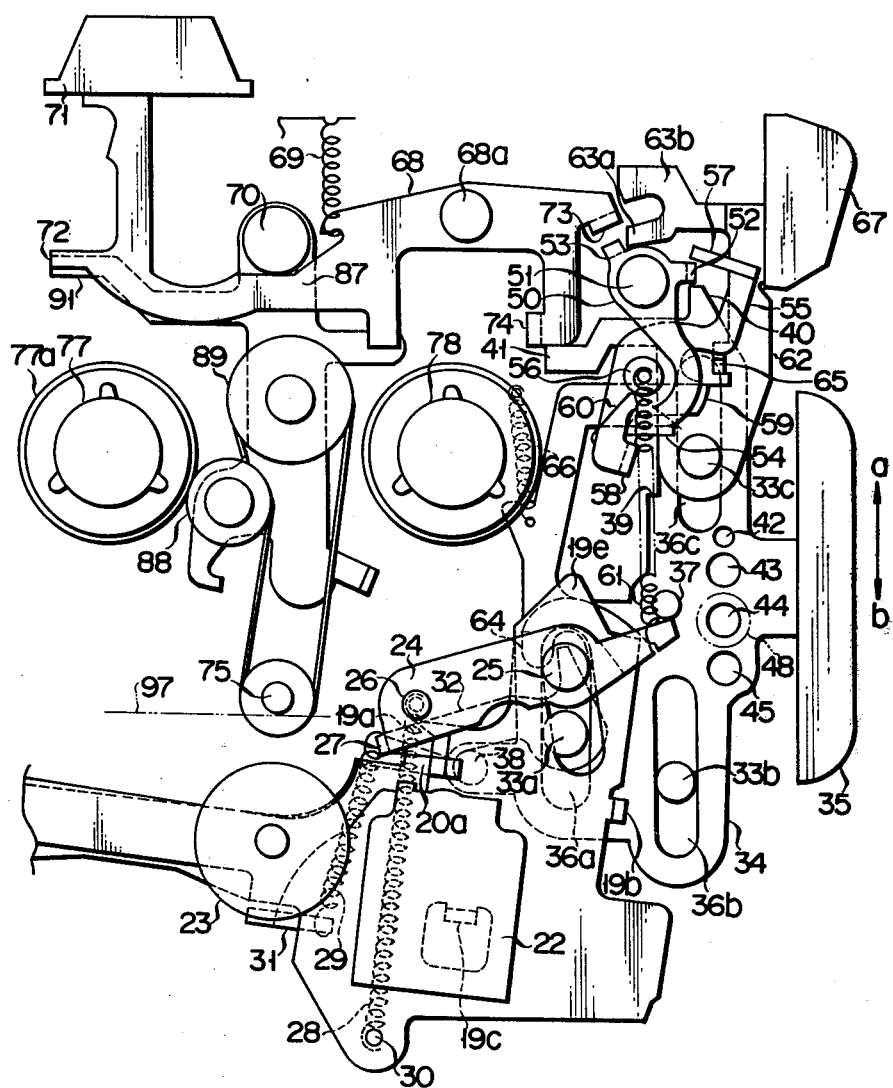

Now we will describe the minature tape recorder according to an embodiment of this invention with reference to the accompanying drawings.

Referring now to FIGS. 1 to 3, this tape recorder 11 has a cover 12 hinged to the forward half of the top surface of a case 10 so that such cover 12 can be rocked through an angular range of 45°, thereby allowing the cassette mount to be loaded with or cleared of a tape cassette freely. The cover 12 is provided with a transparent window 12a through which the cassette mount may be viewed from the outside.

On the front face of the case 10 are installed a volume control dial 13, a built-in microphone net 14, an earphone jack 15, and an external microphone jack 16 in the conventional manner. The backward half of the top surface of the case 10 is provided with a number of small perforations 17, and a sound output reproduced in a reproducing magnetic head is emitted from a speaker (not shown) contained in the backward half section.

The case 10 contains a controlling mechanism 18 as shown in FIGS. 4 and 5. The mechanism 18 is provided with a head support lever 19 and a pinch roller support lever 20 with their respective one-side ends rockably mounted on a common shaft 21 in a horizontal manner so that the shorter lever or the latter is substantially laid on top of the former. A magnetic head 22 is fixed to the rocking-end-side top surface of the head support lever 19, while a pinch roller 23 is rotatably attached to the rocking-end-side top surface of the pinch roller support lever 20. The controlling mechanism 18 has a control lever 24 with the intermediate portion rockably attached to a shaft 25, while a stop pin 26 is protruding downwardly in the vicinity of one rocking end of the lever 24, the rocking end provided with a spring peg 27 extending downwardly. Against the stop pin 26 are pressed the side end of a contact segment or arm 19a extending laterally from the rocking end of the head support lever 19 and the forward end of a contact segment 20a extending forward from the rocking end of the pinch roller support lever 20 both in the same direction. A first tension spring 28 is stretched between the stop pin 26 and a spring pin 30 protruding downwardly at the rocking end of the head support lever 19. A second tension spring 29 is stretched between the spring peg 27 on the control lever 24 and a spring peg 31 extending downwardly at the rocking end of the pinch roller support lever 20. On the rocking-side side end portion of the head support lever 19 is formed a leading strip 19b, while on the bottom surface portion of the lever 19 directly under the head 22 is formed a raised strip 19c protruding downwardly. A substantially L-shaped intermediate lever 32 is disposed under the control lever 24. The intermediate lever 32 is pivotably attached to a first fixed pin 33a at its bent portion, and one side end of the lever 32 is brought into contact with the stop pin 26 on the control lever from the rear or in the same direction as the contact segment 20a. The controlling mechanism 18 is provided with a control plate 34 arranged horizontally in the same manner as the aforesaid levers 19, 20, 24 and 32. On one side of the control plate 34 there protrudes a control button 35, which extends outwardly from the side portion of the case 10 as shown in FIGS. 1 and 2 to allow external operation. The control plate 34 has three longitudinally extending slots 36a, 36b and 36c, in which fixed pins 33a, 33b and 33c are fitted respectively so that these fixed pins may be moved back and forth by shifting the control button in the longitudinal direction as designated by the arrows a, b. The control plate 34 is provided with a stopper pin 37 protruding upwardly so as to come into contact with the other-end side face of the control lever and a pressing pin 38 protruding downwardly so as to come into contact with one-end side face of the intermediate lever 32 at the middle portion and the backward-end side portion of the control plate 34 respectively. Further, a stepped portion 39 and a pressing projection 40 are formed on the middle side face and the forward end face of the control plate 34 respectively, while an engaging tongue 41 is formed on the side face of the control plate 34 beside the projection 40. Furthermore, in the middle area of the control plate 34, there are four circular click holes 42, 43, 44 and 45 longitudinally arranged in a line at predetermined spaces. The forefront click hole 42 is formed smaller than the others 43, 44 and 45. In the fixed substrate 46 fixed within the case 10 is bored a circular hole 47 as shown in FIG. 5 in which a sphere 48 with a predetermined outside diameter is so fitted that both ends of the sphere 48 protrude from the hole 47 to both sides of the substrate 46. One end of the sphere 48 is pressed by a leaf spring 49 with one end fixed to the substrate 46, while the other end of the sphere 48 is fitted optionally in any one of the circular click holes 42, 43, 44 and 45 of the control plate 34 to maintain the control plate 34 in a predetermined position. There is provided an interlocking lever 50 with one end pivotably mounted on a shaft 51. At the pivotal-end side of the lever 50 there protrude a pair of contact segments 52 and 53 extending downward, while at the rocking-end side protrudes another contact segment 54 extending downwardly. The contact segment 52 extends such as to face the forward end of the pressing projection 40 of the control plate 34.

In the controlling mechanism 18 as shown in FIG. 4, a false erasing preventive lever as designated by numeral 55 is rockably mounted on a shaft 56 at its middle portion. The lever 55 has a lug detecting pawl 57 extending upwardly from right to left as in FIG. 4 at the forward end of the lever 55 and having an extended end facing a lug of a loaded tape cassette, a stopper portion 58 extending downward at the backward portion, and a stopper portion 59 provided at the right middle side portion. The middle portion of a formed wire or spring 60 is wound round the shaft 56, while both ends of the spring 60 are engaged with the free end of the interlocking lever 50 and the backward end of the false erasing preventive lever 55. Consequently, the two levers 50 and 55 are connected elastically to each other and may rock together. A tension spring 61 is stretched between the shaft 56 and an end of the control lever 24 opposite to the end provided with the stop pin 26 with respect to the shaft 25, i.e., the end brought into contact with the stopper pin 37.

On the fixed pin 33c is rockably mounted the middle portion of a cue lever 62. On the forward end of the lever 62 are formed forked pressing strips 63a and 63b extending to the left as in FIG. 4, while on the backward end of the lever 62 is formed another pressing strip 64. The pressing strip 63a faces the contact segment 53 on the interlocking lever 50, while the pressing strip 64 faces the other end of the intermediate lever 32. A stop strip 65 protrudes on the left side of the cue lever 62 between the forward pressing strips 63a and 63b and the fixed pin 33c. Further, to a portion of the cue lever 62 between the fixed pin 33c and the backward pressing strip 64 there is connected one end of a tension spring 66 with the other end fixed to the substrate. Thus, the lever 62 is always energized with a clockwise rocking force around the fixed pin 33c. A cue button 67 is attached to the right side of the forward end of the cue lever 62. When the cue button 67 is pushed by hand, the cue lever 62 may be rocked counterclockwise against the energizing force of the spring 66.

Numeral 68 in FIG. 4 designates an FF level the horizontal middle portion of which is pivotably mounted on a shaft 68a. Between the lever 68 and the substrate is stretched a tension spring 69, so that the lever 68 is always rockably energized clockwise, thereby keeping the forward side face of the lever 68 in contact with a pin 70 fixed to the substrate. An FF button 71 is attached to the extended end at the forward extending portion of the FF lever 68. When the button 71 is pressed by hand from the outside of the case, the lever 68 may be rocked counterclockwise against the energizing force of the spring 69. Further, a switch control strip 72 protrudes at the left end of the horizontal portion of the lever 68. Meanwhile, at the right end of the horizontal portion of the lever 68 there are provided a stop strip 73 extending downwardly to face the contact segment 53 on the interlocking lever 50 and a stop strip 74 extending downwardly from the backward extending portion to face the engaging tongue 41 on the control plate 34. Numerals 75 and 97 designated by imaginary lines in FIG. 4 indicate a capstan shaft located in front of the pinch roller 23 and a magnetic tape respectively.

Figure 6:
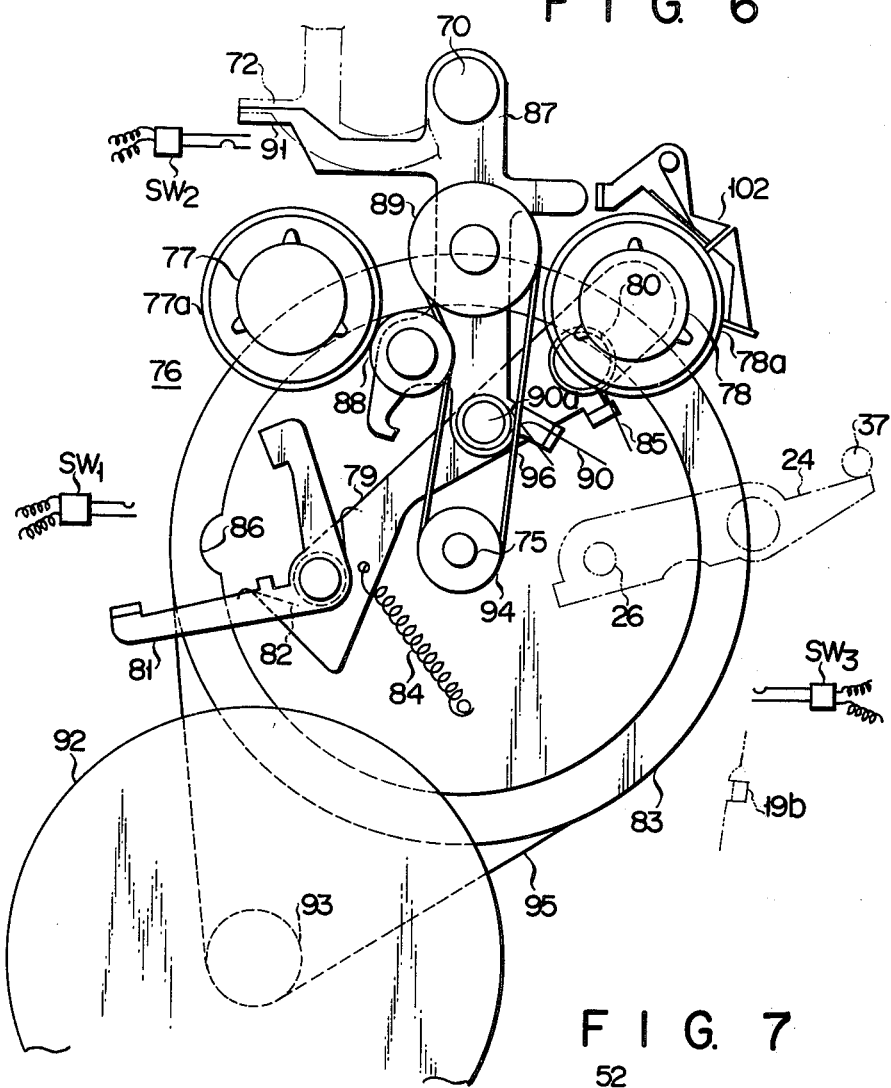

Now we will describe a driving mechanism 76 of the tape recorder according to this invention with reference to FIGS. 4 and 6.

Numerals 77 and 78 indicate a pair of reel shafts disposed in symmetrical positions in front of and with respect to the capstan shaft 75, these reel shafts 77 and 78 having reel stands 77a and 78a at the bottom ends thereof respectively. The left reel shaft 77 on the take-up side is rotatably born by the substrate 46, while the right reel shaft on the supply side is rotatably born by one end of a tape end detecting lever 79. The tape end detecting lever 79 is rendered rockable as a portion thereof near the reel shaft 78 is pivotably mounted on a shaft 80 fixed to the substrate 46. A swinging lever 81 is rockably attached to the other end of the lever 79. The L-shaped swinging lever 81 has a central bent portion pivotably mounted on the detecting lever 79, and is always rockably energized counterclockwise by a formed wire or spring 82 stretched between itself and the detecting lever 79. One end of the swinging lever 81 faces the inner peripheral surface of a flywheel 83 mounted on the capstan shaft 75, while the other end is located opposite a microswitch SW1 for alarm. When the microswitch SW1 is turned "ON" by the action of the swinging lever 81, an alarm sound for notification to an operator that the tape end has been reached is to be produced by an alarm signal generator (not shown). One end of a tension spring 84 with the other end fixed to the substrate is connected to a portion of the tape end detecting lever 79 near the swinging lever 81, and the detecting lever 79 is always energized by a counterclockwise rocking force. A formed wire or spring 85 is wound around a shaft mounted with the lever 79, one end of such spring 85 extending toward a position in front of the stop pin 26 of the control lever 24. On a portion of the inner peripheral surface of the flywheel 83 is formed a semicircular notch 86.

Further, numeral 87 indicates a switch lever located below the FF lever 68 and extendng perpendicularly thereto, the forward end of the switch lever 87 being pivotably mounted on the shaft 70 in contact with the FF lever 68. At the backward end portion and the intermediate portion of the lever 87 are rotatably attached a relatively small idle pulley 88 for forward rotation and a relatively large idle pulley 89 for reverse rotation. A formed wire or spring 90 is attached to the backward end of the switching lever 87 through a projecting pin 90a. One end of the spring 90 extends toward a position in front of the stop pin 26 of the control lever 24. Meanwhile, a switch control strip 91 is formed on the extended end extending horizontally to the left from the forward portion of the switch lever 87. The control strip 91 is so arranged as to be laid substantially on top of the switch strip 72 of the FF lever 68. Behind the two switch strips 72 and 91 is disposed a subswitch SW2 operated by these switch strips 72 and 91.

A main switch designated by SW3 in the figure is disposed in front of the leading strip 19b on the head support lever so as to be operated by such strip 19b. The main switch SW3 and the subswitch SW2 are connected to a motor driving circuit (not shown) in parallel with each other so that a motor 92 may be started when either of these switches is turned on. Pulleys 93 and 94 are integrally attached to the shaft of the motor 92 and the capstan shaft 75 respectively. Endless belts 95 and 96 are stretched between the pulley 93 and the flywheel 83 and between the pulley 94 and the idle pulley 89 respectively for operative connection. The smaller idle pulley 88 presses elastically against the endless belt 96 from the outside and is brought into elastic contact with the reel stand 77a on the take-up-side reel shaft 77 by the belt 96. As a result, the reel shaft 77 may be rotated by the drive of the endless belt 96 by the idle pulley 88.

The supply-side reel 78 is provided with a braking mechanism 102 for stopping the rotation of the reel 78. The braking mechanism 102, located outside the reel stand 78a, has a braking lever 99 rockably mounted on a pin and a pair of braking members 100 pressed against the outside of the reel stand 78a to brake the rotation of the reel 78. The braking members 100 are usually pressed against the reel stand 78a by a formed wire to energize the lever 99 rockingly in the direction toward the reel stand 78a, while, when the head support lever 19 is rocked in the operating direction, the front projection 19e of the lever 19 becomes engaged with the inclined surface of one braking member 100, thereby rocking the lever 99 against the spring 101 to release the braking position.

Figure 7:
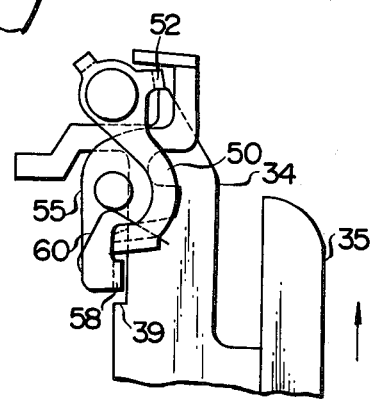

Now we will describe the function of the tape recorder with the above-mentioned construction. This tape recorder may be brought into and kept in the desired operating position by manually shifting the control button 35 back and forth to engage the sphere with the required click hole. In such a position as shown in FIG. 5 where the click hole 44 in the control plate 34 is engaged with the sphere 48, the tape recorder is in an "OFF" position, and the magnetic head 22 and the pinch roller 23, as shown in FIG. 4, are in positions separate from the magnetic tape 97 within the loaded tape cassette (not shown). In this position, the control lever 24 is rockingly biased counterclockwise by the spring 61, its rocking motion restricted by the stopper pin 37 on the control plate 34. The braking mechanism 102 is maintained in a braking position. Meanwhile, when the control button 35 is shifted forward, the pressing projection 40 on the control plate 34 pushes the contact segment 52 of the interlocking lever 50 to rock the interlocking lever 50 counterclockwise. At this time, if the tape recorder is loaded with no tape cassette or the loaded tape cassette has no lug, then the false erasing preventive lever 55 is rocked by the action of the spring 60 accompanying the interlocking lever 50, and the stopper portion 58 of the false erasing preventive lever 55 shifts to a position in front of the stepped portion 39 of the control plate 34, thereby preventing later forward shifting of the control plate 34 so as to avoid recording by false operation (FIG. 7). On the other hand, when the loaded tape cassette is provided with a lug, the lug detecting pawl 57 of the false erasing preventive lever 55 is brought into contact with the lug, thereby preventing the lever 55 from rocking together with the lever 50. Consequently, the control plate 34 is shifted forward without being blocked by the stopper portion 58, and such shifting is to be continued until the click hole 45 gets engaged with the sphere 48. By the shifting of the control plate 34, the pressing pin 38 rocks the control lever 24 clockwise through the intermediate lever 32. Thus, the head support lever 19 and the pinch roller support lever 20, which have so far been restrained from rocking by the stop pin 26 on the control lever 24, are rocked counterclockwise by their respective springs 28 and 29 accompanying the rocking motion of the control lever 24 with their respective contact segments 19a and 20a kept in contact with the stop pin 26 on the control lever 24, thereby bringing the magnetic head 22 and the pinch roller 23 into contact with the magnetic tape 97 (FIG. 8). By the rocking motion of the head support lever 19, the leading strip 19b thereon renders the main switch SW3 closed, thereby actuating the motor 92 through an electric circuit (not shown). As a result, the capstan shaft 75 is rotated, and its rotatory force is transmitted to the take-up-side reel shaft 77 through the pulleys 94, 89 and 88 in order, thereby rotating the take-up-side reel shaft 77 to provide recording condition. By the forward shifting of the control plate 34, the braking member 100 of the braking mechanism 102 is separated from the reel stand 78a as described above to release the braking state of the mechanism 102. In shifting the control button 35 from the "OFF" position to the recording position as shown in FIG. 8, the control lever 24 is rocked around the shaft 25, so that the second tension spring 29, connected to a position further from the center of the control lever 24 or nearer to the free end thereof as compared with the first tension spring 28, is gradually charged with increasing tension. Therefore, the head support lever 19, pinch roller support lever 20, control lever 24, and control plate 34 are energized in the returning direction by the second spring 29 and the tension spring 61 stretched between the control lever 24 and the shaft 56, though the control plate 34 is locked in a recording position according to the engagement between the click hole 45 and the sphere 48.

There will now be described the function for the reproducing position.

After the control button 35 is once returned to the "OFF" position (where the sphere 48 is engaged with the intermediate click hold 44), it is shifted backward or in the direction as indicated by the arrow b in FIG. 4, and the control plate 34 is shifted until the click hole 43 becomes engaged with the sphere. Consequently, the stopper pin 37 rocks the control lever 24 clockwise. The head support lever 19 and the pinch roller support lever 20 rock accompanying the rocking motion of the control lever 24 with their respective contact segments 19a and 20a kept in contact with the stop pin 26 on the control lever 24, and the magnetic head 22 and the pinch roller 23 are brought into contact with the magnetic tape 97 as shown in FIG. 9. By the shifting of the head support lever 19, the leading strip 19b thereon presses against the movable contact segment of the main switch SW3 to render the switch turned "ON", thereby rotating the motor 92. The rotatory force of the motor rotates the capstan shaft 75 and the take-up-side reel shaft 77 to provide a reproducing condition. Also in this case, the springs 29 and 61 are gradually extended and charged with increasing tension accompanying the rocking motion of the control lever 24, though the control plate 34 is locked in the reproducing position according to the engagement between the click hole 43 and the sphere 48. As a result, even though the control button 35 is released, the head support lever 19, pinch roller support lever 20, control lever 24, and control plate may be maintained in the reproducing position without returning to the "OFF" position.

Meanwhile, when the control button 35 is shifted further backward and the control plate 34 is shifted until the smaller click hole 42 becomes engaged with the sphere 48, the stopper pin 37 rocks the control lever 24 further clockwise through a predetermined angular distance. At this time, the stop pin 26 on the control lever 24 comes off the respective contact segments 19a and 20a of the head support lever 19 and the pinch roller support lever 20, shifts further clockwise to press against the formed wire 90 on the switch lever 87, thereby rocking the switch lever 87 counterclockwise, and then comes into elastic contact with the formed wire 85 on the tape end detecting lever 79. In the meantime, the pressing pin 38 on the control plate 34 is shifted backward to come frontally into contact with the raised strip 19c on the head support lever 19, thereby rocking the head support lever 19 counterclockwise. Further, the pinch roller support lever 20, with its spring peg 31 bent downwardly along the back side of the head support lever 19, is rocked counterclockwise accompanying the counterclockwise rocking motion of the head support lever 19. Thus, the magnetic head 22 and the pinch roller 23 come off the magnetic tape 97, and the leading strip 19b on the head support lever 19 releases the energizing force on the main switch SW3. The switch lever 87 is rocked counterclockwise to render the subswitch SW2 turned on by the switch control strip 91 thereby continuing the rotation of the motor 92. Accompanying the rocking motion of the switch lever 87, the smaller idle pulley 88 comes off the reel stand 77a on the take-up-side reel shaft 77, while the larger idle pulley 89 is pressed against the reel stand 78a on the supply-side reel shaft 78 through the endless belt 96, and the rotatory force of the capstan shaft 75 is transmitted to the supply-side reel shaft 78 to rotate the supply-side reel shaft 78, thereby rewinding the tape (FIG. 10). In this case, the springs 61 and 29 are charged accompanying the rocking motion of the control lever 24, so that the head support lever 19, pinch roller support lever 20, control lever 24, and control plate 34 are energized in the returning direction by the springs 61 and 29. However, as the click hole 42 in the control plate 34 is engaged with the sphere 48, it requires only a slight force to maintain the control button 35 in the tape rewinding position. Nevertheless, since the click hole 42 is of a rather small size, the sphere 48 cannot be fitted fully into the hole 42 unlike in the cases of the other click holes 43, 44 and 45. Accordingly, the above-mentioned members may not be maintained in the tape rewinding position by the engagement between the hole 42 and the sphere 48 alone, so that when the control button 35 is released, these members shift in the returning direction and are maintained in a position where the click hole 43 is engaged with the sphere 48, i.e., a reproducing position.

In such a manner as described above, all the recording, reproducing, and tape rewinding operations may be performed by forward and backward shifting of a single button or the control button 35 alone. As for the quick-traverse and discriminating signal recording operations, they may be performed by pressing down the FF button 71 and cue button 67 respectively, which will be described hereinafter.

Figure 11:
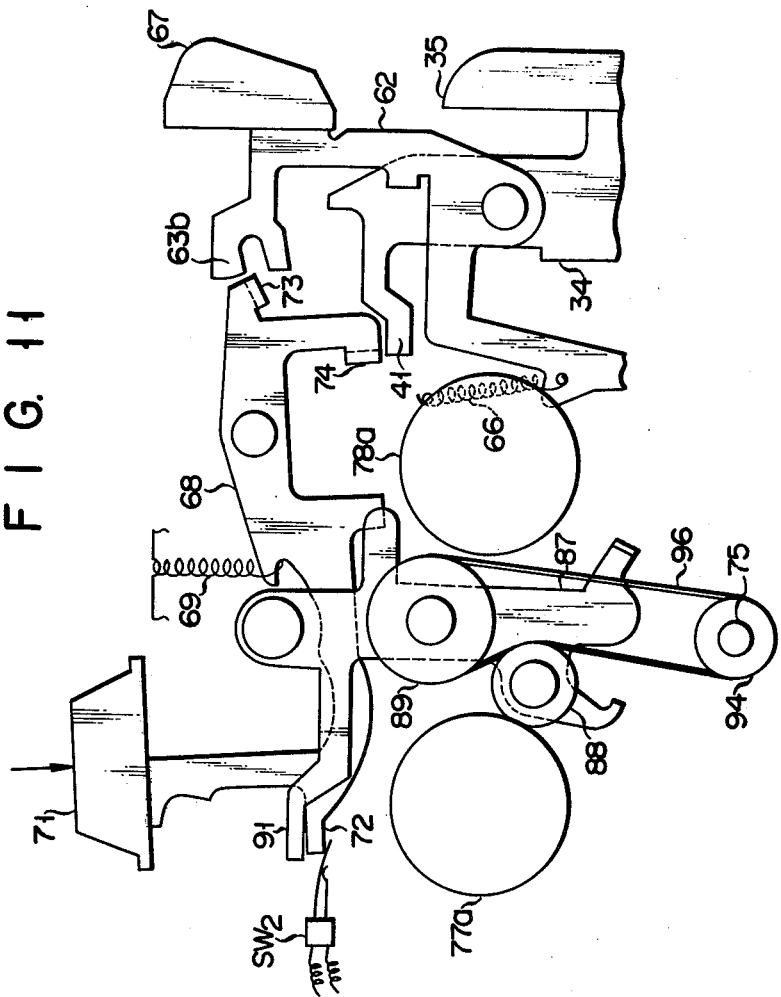

The FF button 71 protruding on the front face of the case is pressed down to rock the FF lever 68 counterclockwise against the energizing force of the spring 69, and the switch control strip 72 on the lever 68 presses against the movable contact segment of the subswitch SW2. Thus, when the subswitch SW2 is turned "ON", the motor 92 is actuated to rotate the take-up-side reel shaft 77 through the flywheel 83 and the pulleys 94, 89 and 88 in order (FIG. 11). At this time, the pinch roller 23 is separate from the capstan shaft 75, so that the capstan shaft 75 may not supply the tape, and the magnetic tape 97 is solely quickly wound around the take-up-side reel within the tape cassette via the rotation of the take-up-side reel shaft 77 at the speed thereof. When the FF button 71 is released, the FF lever 68 returns in situ by the action of the spring 69 to open the subswitch SW2, thereby stopping the motor. While in recording operation, the engaging tongue 41 of the control plate 34 is located on the orbit of the stop strip 74 of the FF lever 68 to prevent the FF button 71 from being pressed down. Further, during quick-traverse operation, the stop strip 74 is located on the orbit of the engaging tongue 41, thereby prohibiting recording operation.

Figure 13:
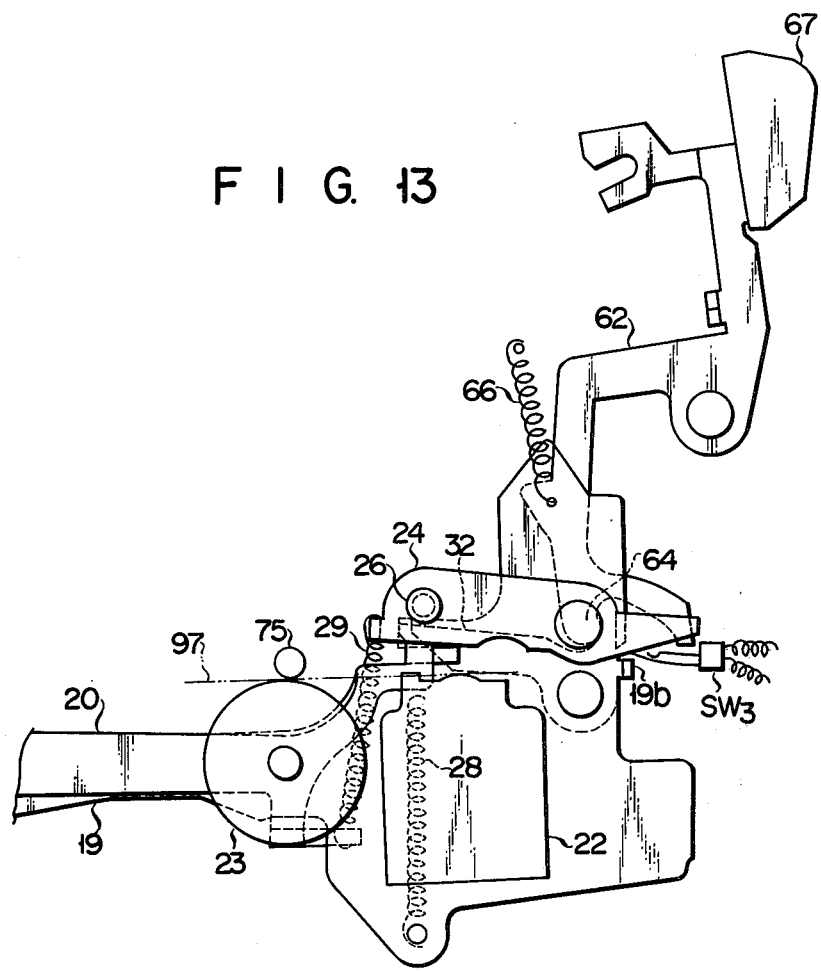

Further, when the cue button 67 is pressed down and the cue lever 62 is rocked counterclockwise against the spring 66, the pressing strip 63a of the cue lever 62 presses against the contact segment 53 of the interlocking lever 50 to rock the interlocking lever counterclockwise. At this time, if the tape recorder is not loaded with a tape cassette or the loaded tape cassette does not have a lug, the false erasing preventive lever 55 rocks accompanying the interlocking lever, and the stopper portion 59 of the false erasing preventive lever 55 is shifted to a position on the orbit of the stop strip 65 of the cue lever 62 to prevent further rocking of the cue lever 62, thereby prohibiting discriminating signal recording by false operation (FIG. 12). If the loaded tape cassette is provided with a lug, however, the false erasing preventive lever 55 has its detecting pawl 57 brought into contact with such lug without accompanying the rocking motion of the interlocking lever 50, thereby allowing the cue lever 62 to rock. Thus, when the cue lever 62 is rocked fully counterclockwise, the pressing strip 64 on the cue lever 62 pushes and turns the intermediate lever 32 clockwise to press the strip pin 26 on the control lever 24 by one end of the intermediate lever 32, thereby rocking the control lever 24 clockwise against the spring 61. Then, the head support lever 19 and the pinch roller support lever 20 are rocked counterclockwise accompanying the rocking motion of the control lever 24, and the magnetic head 22 and the pinch roller 23 are brought into contact with the magnetic tape 97 (FIG. 13). Further, the movable contact segment of the main switch SW3 is pushed by the leading strip 19b of the head support lever 19 to render the main switch SW3 turned "ON", and the motor 92 is actuated to rotate the capstan shaft 75 and the take-up-side reel shaft 77, thereby providing discriminating signal recording condition. Here the discriminating signal is a signal for discriminating between records requiring actual entry and records requiring no entry (e.g., instructions for entry) in reproducing any information orally recorded on the magnetic tape 97 for entry by typewriting or handwriting.

Meanwhile, the tape recorder 11 is so devised that when the supply-side reel of the tape cassette has run out of magnetic tape during recording operation, the alarm signal generator is operated to produce an alarm sound for notification to the operator that the tape end has been reached. Now we will describe the operation related to this with reference to FIGS. 14 and 15.

When the cassette mount is loaded with the tape cassette and the control button 35 is shifted forward, recording operation may be performed with the click hole 45 engaged with the sphere 48 as described above provided the tape cassette has a lug. At this time, the tape end detecting lever 79 bearing the supply-side reel shaft 78 is applied with the tension of the magnetic tape 97 as a clockwise rotatory force, though the detecting lever 79 is prohibited from rocking by the spring 84.

Figure 16:
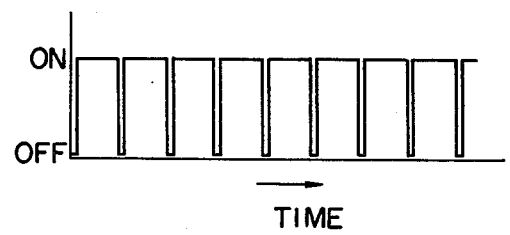

Further, in this position, one end of the swinging lever 81 is separate from the inner peripheral surface of the flywheel 83, while the other end of the lever 81 is separate from the microswitch SW1 for alarm (see FIG. 6). Thus, when the supply-side reel of the tape cassette has run out of magnetic tape 97, the tension on the tape increases suddenly because its terminal end is fixed to the reel, the tape end detecting lever 79 is rocked clockwise against the spring 84, and the swinging lever 81 is displaced substantially to fit its one end into the notch 86 on the flywheel 83 (FIG. 14). Since the flywheel 83 is rotating clockwise, however, the inner edge of the notch 86 pushes and turns one end of the swinging lever 81 against the formed wire 82. Consequently, one end of the swinging lever 81 strikes against the inner peripheral surface of the flywheel, while the other end of the lever 81 presses against the movable contact segment of the microswitch SW1. Thus, when the switch SW1 is turned "ON", the alarm signal generator operates to produce an alarm sound for notification that the tape end has been reached (FIG. 15). Meanwhile, one end of the swinging lever 81 is fitted into the notch 86 once for each rotation of the flywheel 83, thus rocking the lever 81 counterclockwise by the action of the spring 82, while the other end of the lever 81 is separated from the movable contact segment of the microswitch SW1 as shown in FIG. 14. Accordingly, the switch SW1 is to be instantaneously rendered "OFF" each time the flywheel 83 makes a turn as shown in FIG. 16. However, the switch SW1 is in the "OFF" position for so short a time interval that the alarm sound is produced substantially continually.

Having the aforementioned construction, the tape recorder 11 according to this embodiment of the invention may provide the following advantages.

First, all the recording, reproducing, and tape rewinding operations may be performed by forward and backward shifting of the single control button 35 alone, this tape recorder 11 is simpler in construction and more efficient to operate when compared with tape recorders with control buttons provided for the respective operations. Further, the control plate 34 is provided with a relatively small click hole 42 and relatively large click holes 43, 44 and 45 while the substate 46 is provided with a hole 47 so that the sphere 48 fitted in the hole 47 is pressed against any one of these click holes 42 to 45 by the leaf spring 49. Therefore, the magnetic head 22 and the pinch roller 23 may be maintained securely in the "OFF" position by engaging the click hole 44 with the sphere 48, while the magnetic head 22 and the pinch roller 23 may be optionally stopped at the recording or reproducing position by engaging the click hole 45 or 43 respectively with the sphere 48. In the tape rewinding operation, the control button may be maintained in the predetermined rewinding position correctly with relatively small force. While such rewinding operation should referably be performed only while the operator is maintaining the control button in the predetermined rewinding position, the tape recorder according to this embodiment fulfills such requirement rendering the smaller click hole 42 engaged with the sphere 48. That is, when the control button 35 is shifted to the position where the click hole 42 is engaged with the sphere 48, the tape recorder is put into the tape rewinding mode, so that the control button 35 may be maintained in the prescribed rewinding position correctly with a relatively small force by engaging the click hole 42 with the sphere 48. In addition, the click hole is small that the engagement between the click hole 42 and the sphere 48 alone may not resist the returning force of the control plate 34, so that the tape rewinding mode may be removed when the operator releases the control button 35.

Further, the head support lever 19 mounted with the magnetic head 22 and the pinch roller support level 20 mounted with the pinch roller 23 are rockably attached to the common shaft 21, and the first and second springs 28 and 29 are stretched between the control lever and the head support lever 19 and between the control lever 24 and the pinch roller support lever 20 respectively so that the two levers 19 and 20 may rock accompanying the control lever 24 and the second spring 29 may be charged accompanying the shift of the magnetic head and the pinch roller 23 toward the tape cassette. Accordingly, the tape recorder according to this invention requires no such strong spring as has been used with the conventional tape recorders for elastically uniting the head support lever with the pinch roller support lever so as to shift the two levers accompanying the control lever, so that the control button 35 may be operated easily, assuring improved operability.

Meanwhile, the second spring 29 may also function as a returning spring for returning the two springs 19 and 20, so there is no need of any exclusive returning spring, thereby assuring a reduced number of components and simplified construction. In this case, the first spring 28, if fixed to the spring peg 27 at one end, may also function as a returning spring.

Further, the false erasing preventive lever 55 is commonly used for preventing recording by false operation of the control button 35 and recording by false operation of the cue button 67 provided separately besides the control button 35, so that the number of components may be reduced to simplify the construction.

Furthermore, the supply-side reel shaft 78 is attached to one end of the rockable tape end detecting lever 79 to rock the detecting lever 79 by means of the tension at the terminal end of the magnetic tape 97, thereby displacing the swinging lever 81 mounted on the other end of the detecting lever to the switch operating position, where one end of the swinging lever 81 is pushed and turned by the notch 86 formed on the inner peripheral surface of the flywheel 83 so as to rub such one end of the swinging lever 81 against the inner peripheral surface of the flywheel 83, thereby closing the microswitch SWI for alarm with the other end of the swinging lever 81 to operate the alarm signal generator. Therefore, the operator may immediately be informed of termination of the tape on the supply reel side by hearing the alarm sound produced by such alarm signal generator. Moreover, since the tape end detecting lever 79 is pivotally attached to a point in the vicinity of the supply-side reel shaft 78, the displacement of the reel shaft 78 by the tension of the tape is transmitted magnified to the swinging lever 81, thereby enabling the swinging lever 81 to be displaced substantially. Further, one end of the swinging lever 81 is fitted into the notch on the flywheel 83 so as to rock the swinging lever 81 through the rotatory force of the flywheel, so the swinging lever may operate securely. Furthermore, an alarm sound is to be produced when one end of the swinging lever 81 is rubbed against the inner peripheral surface of the flywheel 83, so that such alarm sound may be emitted substantially continually, thereby providing satisfactory informative performance. Although the tension of the tape acts intensively on the supply-side reel shaft 78 even during the tape rewinding operation, the alarm signal generator will not be falsely operated during such operation because the stop pin 26 on the control lever 24 prevents the clockwise rocking of the tape end detecting lever 79 against the formed wire 85 on the detecting lever 79.

Moreover, in the tape rewinding mode, the switch lever 87 is pushed and turned by the stop pin 26 on the control lever 24 to press the idle pulley 89 attached to the switch lever 87 against the reel stand 78a on the supply-side reel shaft 78 via the endless belt 96, while the stop pin 26 pushes and turns the switch lever 87 through the spring 90, so that the pressing force of the idle pulley 89 against the reel stand 78a may be adjusted properly by the elasticity of the spring 90. Therefore, there will neither be damage to the belt 96 by too strong a pressing force nor slippage between the belt 96 and the reel stand 78a due to too weak a pressing force.

Figure 17:
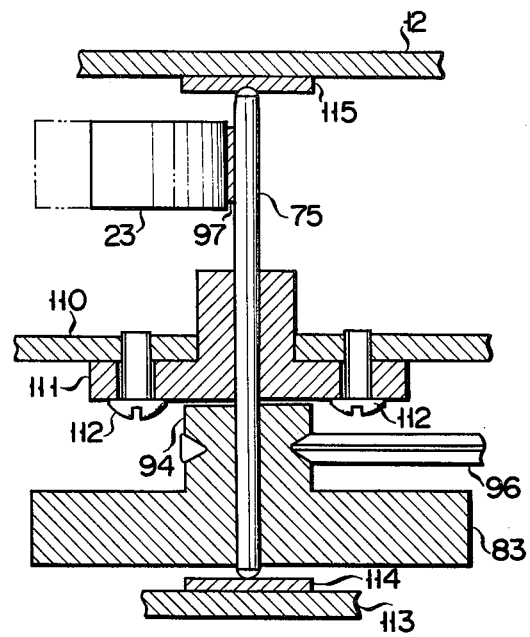
FIG. 17 is a sectional view illustrating a bearing mechanism for a capstan shaft.

As described in detail hereinbefore, the invention provides a tape recorder characterized by comprising the rockable control lever, head support lever and pinch roller support lever mounted rockably anc coaxially with each other, magnetic head and pinch roller attached to the respective support levers, a first spring stretched between the control lever and the head support lever to shift the magnetic head toward the tape cassette accompanying the rocking motion of the control lever, and a second spring stretched between the control lever and the pinch roller support lever to shift the pinch roller toward the tape cassette accompanying the rocking motion of the control lever, at least one of the first and second springs being charged with returning force accompanying the magnetic head and the pinch roller shifting toward the tape cassette. In the aforementioned tape recorder, there is provided a means for preventing the capstan shaft from deflecting or shifting in the thrust direction as shown in FIG. 17. That is, the capstan shaft 75 is rotatably born by a bearing 111 attached to a substate 110 by means of screws 112, and its bottom end is supported by the top surface of an abrasion-resisting metal plate 114 placed on a support plate 113. Further, the top end of the capstan shaft 75 is supported by an abrasion-resisting metal plate 115 attached to the inner surface of the cover 12 which is to be brought into contact with the top end of the capstan shaft 75 when the cover 12 is closed. Thus, the capstan shaft 75, supported by these metal plates 114 and 115 from both upper and lower sides, is prevented securely from shifting in the thrust direction.

Therefore, according to this invention, there may be provided a controlling mechanism for a tape recorder with a reduced number of components and simple construction requiring neither a spring for uniting the head support lever and the pinch roller support lever, nor a returning spring for separating the magnetic head and the pinch roller attached to the respective support levers from the tape cassette, nor a spring for allowing the two support levers to follow the control lever to be provided separately, but follow-up springs to be stretched between the respective support levers and the control lever, rendering the rocking motion of the control lever easier by eliminating the returning spring and assuring easy operation.

Figure 18:
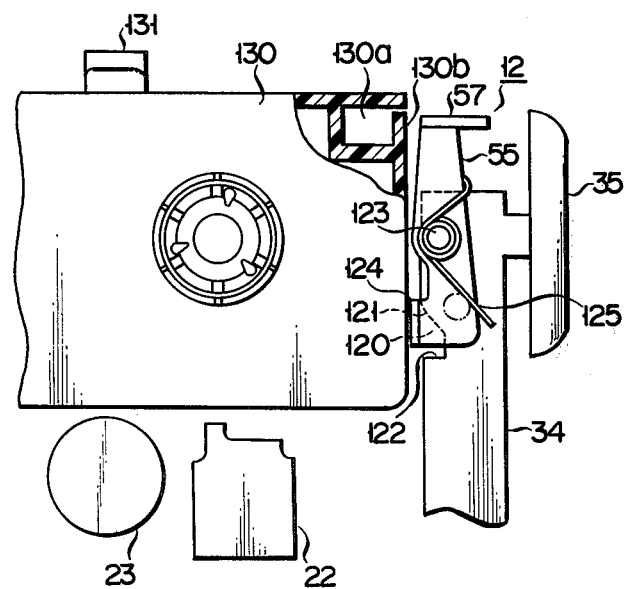
FIG. 18 is a partially broken top view illustrating a modification of a false erasing preventive mechanism.

Now we will describe a modified example of the false erasing preventive mechanism with reference to FIG. 18.

What numerals 22, 23, 34, 35 and 55 designate are substantially the same as the magnetic head, pinch roller, control plate, control button, and false erasing preventive lever respectively of the tape recorder according to the above-mentioned embodiment. On the left of the control plate 34 as in FIG. 18 is formed a recess 120, which has a cam surface 121 inclined as compared with the shifting direction of the control plate 34 and a stop surface 122 substantially perpendicular to the shifting direction of the control plate 34 at the forward and backward side edges respectively thereof. Meanwhile, the false erasing preventive lever 55 is rockably mounted on the fixed shaft 123 at its central portion. The false erasing preventive lever 55, having the lug detecting pawl 57 and a stopper portion 124 at one and the other end respectively, is rockingly biased counterclockwise by a formed wire wound around the fixed shaft, while the stopper portion is brought into contact with one side portion of the control plate 34.

By the forward and backward shifting of the control plate 34, this tape recorder is optionally put into "OFF", recording, reproducing, or rewinding position in the same manner as is the case with the above-mentioned embodiment.

When the control plate 34 is in the "OFF" position, the stopper portion 124 of the false erasing preventive lever 55 comes into contact with the cam surface 121 of the control plate 34 as shown in FIG. 18, and the control plate 34 prevents the lug detecting pawl 57 on the false erasing preventive lever 55 from shifting to a position where the pawl 57 is inserted in a false erasing preventive opening 130a of a cassette 130. Thus, when the control button 35 is manually operated to shift the control plate 34 forward so as to put the tape recorder into the recording mode, the false erasing preventive lever 55, with its stopper portion 124 rubbed against the cam surface 121, is rocked counterclockwise by the spring 125. In this case, if the loaded cassette is provided with a lug 130b, the false erasing preventive lever 55 brings its lug detecting pawl 57 into contact with the lug 130b of the cassette 130. When the control plate 34 is shifted further forward, the magnetic head 22 and the pinch roller 23 shift toward the cassette 130 following the control plate 34, thereby forming the recording mode. However, if the cassette mount is loaded with no cassette 130 or the loaded cassette 130 is not provided with a lug 130b, i.e., the lug is removed to open the false erasing preventive opening 130a, the false erasing preventive lever 55 is rocked accompanying the forward shifting (initial switching operation over to the recording mode) of the control plate 34 until the lug detecting pawl 57 is inserted in the false erasing preventive opening 130a of the cassette 130. At this time, the stopper portion 124 is fitted into the recess 120 and comes in front of the stop surface 122. Therefore, further forward shifting (switching operation over to the recording mode) of the control plate 34 is prevented.

In FIG. 18, numeral 131 indicates a leaf spring elastically pressed against the back side of the cassette 130.

In the aforementioned mechanism as shown in FIG. 18, when the operating mode of the tape recorder is rendered "OFF", the lug detecting pawl 57 of the false erasing preventive lever 55 is maintained outside the cassette mount, so the cassette mount may be loaded with the cassette freely in such position.

Further, the false erasing preventive lever 55 is rocked accompanying the initial switching operation of the control plate over to the recording mode until the lug detecting pawl 57 is inserted in the false erasing preventive opening 130a of the cassette 130. Thus, if the cassette mount is not loaded with a cassette 130 or the loaded cassette 130 is not provided with a lug, the switching operation of the control plate 34 over to the recording mode is prevented by the stopper portion 124 of the false erasing preventive lever 55. Meanwhile, if the loaded cassette 130 is provided with a lug 130b, the lug detecting pawl 57 is brought into contact with the lug 130b, thereby preventing the stopper portion 124 from fitting into the recess 120 of the control plate 34, so that the control plate 34 may securely perform the switching operation over to the recording mode without being prevented by the false erasing preventive lever 55.

What we claim is:

1. A tape recorder provided with a controlling mechanism to support movably a pinch roller and a magnetic head between a first position where said pinch roller and magnetic head come in contact with a tape and a second position where they leave the tape; said controlling mechanism comprising: a head support lever supporting said magnetic head, a pinch roller support lever supporting said pinch roller, said levers being mounted rockably and coaxially with respect to each other, a control lever rockable between a first position and a second position, a first spring connected between said control lever and the head support lever such that the magnetic head is shifted toward the tape upon rocking of the control lever toward said first position, and a second spring connected between said control lever and the pinch roller support lever such that the pinch roller is shifted toward the tape upon rocking of the control lever toward said first position, at least one of said first and second springs being tensioned so as to be charged with a returning force upon the magnetic head and the pinch roller being shifted toward the tape by said control lever.

2. A tape recorder according to claim 1, wherein said controlling mechanism includes a fixed shaft mounted with the middle portion of said control lever to render said control lever rockable, spring support means provided on one rocking end of the control lever so as to bear one end of each of said first and second springs, and a movable manual control plate provided with a stop pin in contact with the other rocking end of the control lever whereby upon movement of said manual control plate said control lever is rocked towards said first position.

3. A tape recorder according to claim 2 wherein said spring support means includes a first support member for supporting the first spring and a second support member for supporting the second spring, said first support member bearing the spring at a point nearer to the fixed shaft as compared with said second support member.

4. A tape recorder according to claim 3 wherein said first and second springs are tension springs.

5. A tape recorder according to claim 1 further comprising a communicator for automatically detecting and notifying the terminal end of a tape in said recorder.

6. A tape recorder according to claim 5, wherein said communicator includes a rockable tape end detecting lever rockable about an axis, a supply-side reel shaft mounted on said tape end detecting lever to one side of said axis and a swinging lever mounted on said tape end detecting lever to the other side of said axis, means for biasing said tape end detecting lever in a first direction, a flywheel installed on a capstan shaft for rocking said swinging lever relative to said detector lever, means for producing a rotary force when said detecting lever is rocked by a tension at the tape end applied on the supply-side reel shaft, an alarm signal generator operable in response to the rocking motion of said swinging lever, and a tape rewinding mechanism for rotatively driving the supply-side reel shaft while preventing said detecting lever from rocking in a nonbiased direction which is opposite to said first direction.

7. A tape recorder according to claim 5, wherein said communicator includes a rockable tape end detecting lever rockable about an axis, means for biasing said detecting lever in one direction, a tape-feed-side reel shaft born at a point near the axis about which said detecting lever is rockable to apply a tension at the tape end in a nonbiased direction opposite said one direction to said detecting lever, a swinging lever attached to said detecting lever at a position spaced from said detecting lever axis and elastically united with said detecting lever, a flywheel installed on a capstan shaft, a notch formed on said flywheel to be engaged with one end of said swinging lever when said detecting lever rocks in the nonbiased direction, and an alarm signal generator with an electric power switch operable in response to the rocking motion of said swinging lever relative to said detecting lever, whereby the flywheel acting on the swinging lever engaged with said notch applies a component force to said detecting lever in the nonbiased direction.

8. A tape recorder according to claim 1 further comprising a tape rewinding mechanism provided with an idle pully and a means for elastically pressing said idle pulley against a reel stand on the supply-side shaft to transmit the rotation of said idle pulley to the feed-side reel shaft, thereby rewinding the tape.

9. A tape recorder according to claim 1 further comprising a false erasing preventive mechanism for preventing both sound and discriminating signals from being recorded when said tape recorder is loaded with a tape cassette without lug.

10. A tape recorder according to claim 9, wherein said false erasing preventive mechanism includes a control button for sound recording, a control button for discriminating signal recording, an interlocking lever operably connected to said control button so as to be operable to rock from a first position to a second position upon the initial movement of both said control buttons into a recording position, and a false erasing preventive lever usually located in such position as to allow the recording position of both said control buttons, said interlocking lever when rocking to said first position preventing said recording position of both said control buttons, and means for preventing the rocking motion of said false erasing preventive lever accompanying the interlocking lever, said last mentioned means being the lug of the loaded tape cassette when inserted in said recorder.

11. A tape recorder according to claim 9, wherein said false erasing preventive mechanism includes a control plate operably connected to said tape recorder and adapted in a first position to switch the tape recorder into a recording mode and in a second position into an "OFF" mode, and a false erasing preventive lever with a lug detecting pawl operatively connected to said control plate and adapted to be inserted in a false erasing preventive opening of the cassette, said false erasing preventive lever comprising means for preventing said control plate from occupying said first position when said detecting pawl is inserted in the false erasing preventive opening of the cassette, said control plate, when in said second position preventing said lug detecting pawl from entering said false erasing preventive opening, and at the time of initial switching over to said first position moving the lug detecting pawl into said false erasing preventive opening.

* * * * *